United States Patent [19]
Gellert

[11] Patent Number: 5,599,567
[45] Date of Patent: Feb. 4, 1997

[54] COOLED THREAD SPLIT INSERTS FOR INJECTION MOLDING PREFORMS

[76] Inventor: Jobst U. Gellert, 7A Prince Street, Georgetown, Ontario, Canada, L7G 2X1

[21] Appl. No.: 558,622

[22] Filed: Nov. 13, 1995

[30] Foreign Application Priority Data

Oct. 16, 1995 [CA] Canada ................................. 2160644

[51] Int. Cl.⁶ .......................... B29C 45/73; B29C 49/06
[52] U.S. Cl. .................. 425/526; 264/328.16; 264/537; 425/441; 425/525; 425/533; 425/552
[58] Field of Search .......................... 425/190, 192 R, 425/525, 526, 552, 577, 441, 443, 533; 264/537, 538, 328.14, 328.16

[56] References Cited

U.S. PATENT DOCUMENTS

| | | | |
|---|---|---|---|
| 3,281,514 | 10/1966 | Polka | 425/533 |
| 3,470,282 | 9/1969 | Scalora | 425/533 |
| 3,868,202 | 2/1975 | Valyi | 425/533 |
| 4,871,507 | 10/1989 | Ajmera | 425/526 |
| 5,501,593 | 3/1996 | Marcus | 425/526 |

OTHER PUBLICATIONS

"High Performance Preform Tool Set with Real-time Closed Loop Mold Monitoring" prepared by Unitech Engineered Products.

*Primary Examiner*—Jay H. Woo
*Assistant Examiner*—Joseph Leyson
*Attorney, Agent, or Firm*—Dalesman & Company

[57] ABSTRACT

Thread split inserts used in injection molding bottle preforms of polyethylene terephthalate (PET). Each insert has a curved inner surface. A pair of inserts are mounted in the mold facing each other so the inner surfaces combine to form an opening therethrough. The opening provides the portion of the cavity which forms the neck portion of the preform. Each of the thread split inserts has an enclosed conduit through which cooling fluid circulates to improve cooling and reduce molding cycle time. The cooling fluid conduit has three curved portions which extend around the curved inner surface. Two of the curved portions extend in one plane and the other curved portion of the cooling fluid conduit extends in a second parallel plane.

5 Claims, 3 Drawing Sheets

5,599,567

COOLED THREAD SPLIT INSERTS FOR INJECTION MOLDING PREFORMS

BACKGROUND OF THE INVENTION

This invention relates generally to injection molding and more particularly to cooled thread split inserts used in injection molding bottle preforms of polyethylene terephthalate (PET).

Using a pair of thread split inserts in a mold to form the threaded neck portion of a PET bottle preform is well known as described and shown on a Project Report prepared by Unitech Engineered Products entitled "High Performance Preform Tool Set with Real-time Closed Loop Mold Monitoring". In addition to the threads, the neck portion of the preform has a circumferential ring collar which is also utilized in ejecting the preform from the mold. It is imperative that the neck portion of the preform be adequately cooled prior to ejection and thus the cooling rate of the neck portion is a major factor in determining minimum cycle time. As these preforms are molded in extremely large quantities, having a minimum molding cycle time is extremely critical to commercial viability. It has been found that the relatively slow cooling rate provided by existing thread split inserts is a major factor in preventing cycle time being reduced.

SUMMARY OF THE INVENTION

Accordingly, it is an object of the present invention to at least partially overcome the disadvantages of the prior art by providing thread split inserts with improved cooling capability.

To this end, in one of its aspects, the invention provides a pair of thread split inserts used in injection molding elongated hollow bottle preforms, each preform having a neck portion with an outer surface forming a ring collar and threads extending between an open end and the ring collar, each thread split insert having a rear end and first and second flat inner aligned faces extending on opposite sides of a curved inner surface, the thread split inserts to be mounted together in a mold with the respective flat inner surfaces of the thread split inserts abutting wherein the curved inner surfaces of the thread split inserts combine to form an opening therethrough shaped to mold the outer surface of the neck portion of the preform, each thread split insert having a semicircular groove to form the ring collar and a thread portion extending between the semicircular groove and the rear end to form the threads, the improvement wherein each thread split insert has an enclosed conduit with a predetermined configuration for circulating cooling fluid through the thread split insert, the cooling fluid conduit having an inlet portion and an outlet portion extending close together midway around the curved inner surface, a first curved portion extending around the curved inner surface from the inlet portion to a first longitudinal portion near the first flat inner aligned face, a second curved portion extending around the curved inner surface from the first longitudinal portion to a second longitudinal portion near the second flat inner aligned face, and a third curved portion extending around the curved inner surface from the second longitudinal portion to the outlet portion.

Further objects and advantages of the invention will appear from the following description taken together with the accompanying drawings.

DETAILED DESCRIPTION OF THE DRAWINGS

Figure 1:
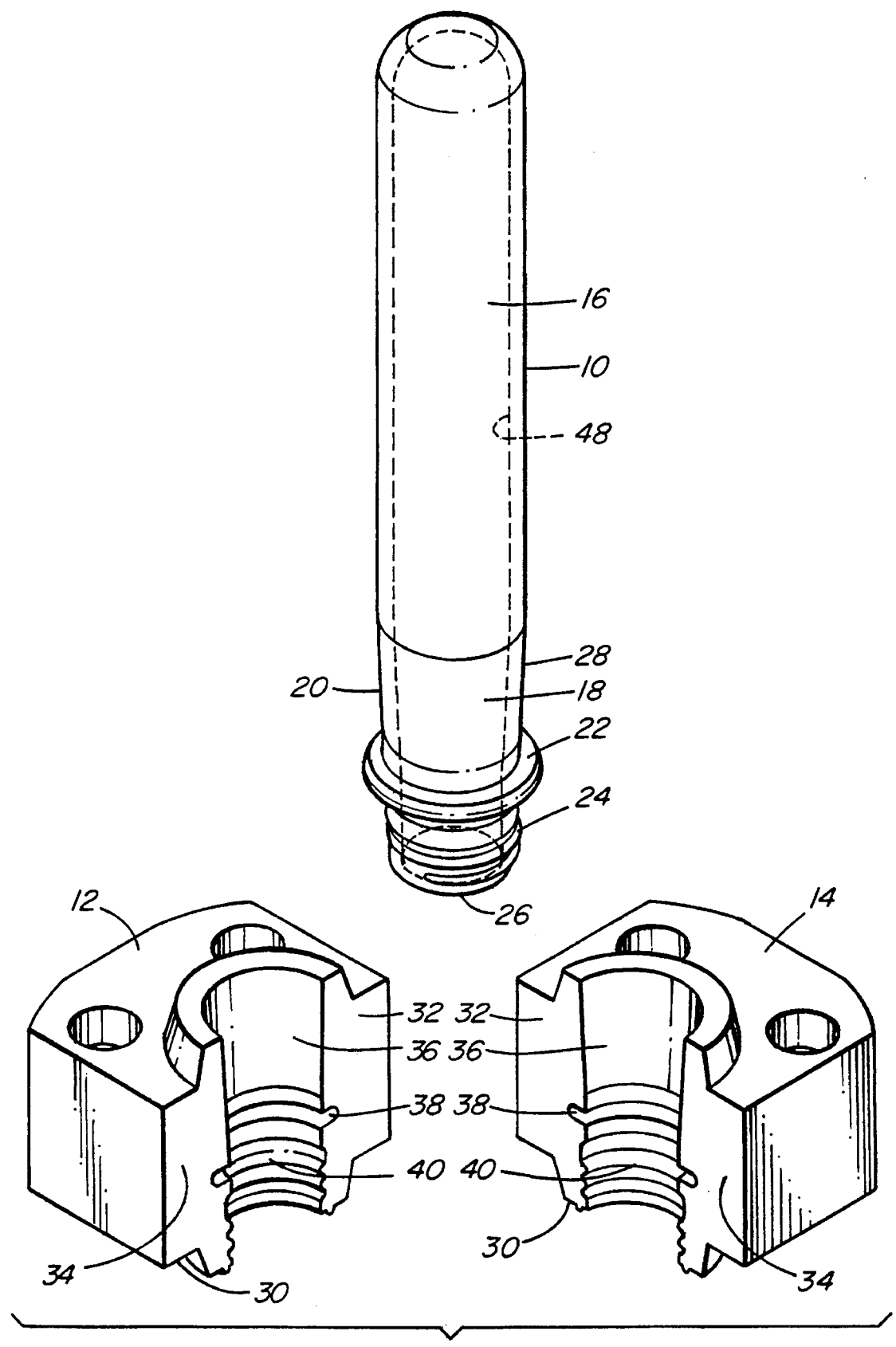
FIG. 1 is an isometric view showing a bottle preform and a pair of thread split inserts according to a preferred embodiment of the invention.

Reference is first made to FIG. 1 which shows a bottle preform 10 and a pair of thread split inserts 12, 14 according to a preferred embodiment of the invention. As can be seen, the bottle preform 10 is hollow and is elongated to a selected length. It is injection molded of polyethylene terephthalate (PET) according to a conventional injection molding cycle in a mold which is also conventional except for the cooling fluid conduits provided in the thread split inserts 12, 14 according to the invention as described below.

The bottle preform has an elongated cylindrical portion 16 extending from a neck portion 18. As is well known, the cylindrical portion 16 is later enlarged by stretching and then blow molding to form a beverage bottle. The neck portion 18 has an outer surface 20 which forms a cylindrical ring collar 22 and threads 24 extending between the ring collar 22 and the open end 26 and may include a slightly tapered portion 28 as shown. After the preform 10 is stretch-blow molded and the resulting bottle is filled with a suitable beverage, a removable threaded cap (not shown) is screwed onto the threads 24 to close the bottle. The ring collar 22 is normally in the stretch-blow molding process, but also is used to assist in ejecting the preform 10 from the core.

Each of the pair of steel thread split inserts 12, 14 has a rear end 30 and a pair of flat aligned inner faces 32, 34 extending on opposite sides of a curved inner surface 36. The curved surface 36 is generally semicircular except it has an outwardly extending semicircular groove 38 and a thread portion 40 extending between the semicircular groove 38 and the rear end 30.

Figure 2:
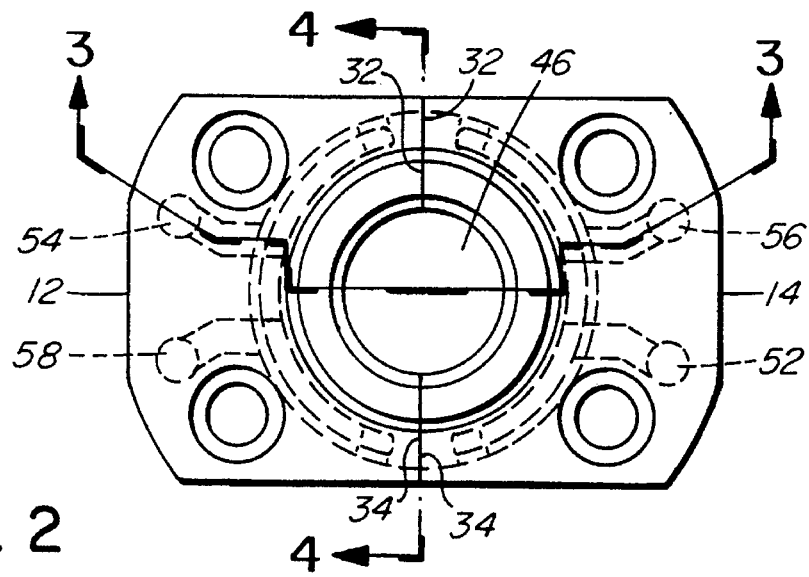
FIG. 2 is a plan view of the pair of thread split inserts mounted together in the molding position.
Figure 3:
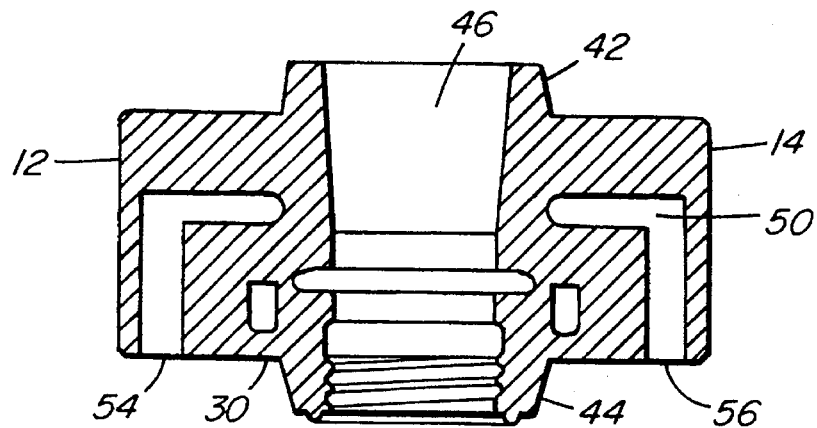
FIG. 3 is a sectional view along line 3—3 in FIG. 2.
Figure 4:
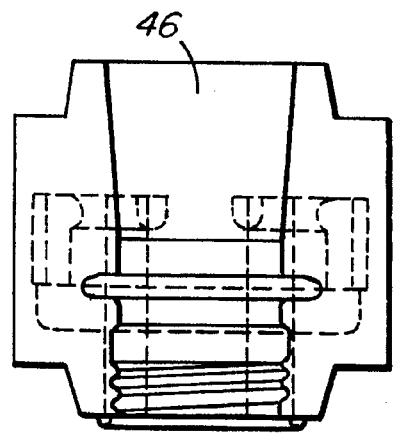
FIG. 4 is a sectional view along line 4—4 in FIG. 2.

As seen in FIGS. 2, 3 and 4, when the pair of thread split inserts 12, 14 are mounted together in the rest of the mold they are secured tightly together by the tapered flange portions 42, 44 at both ends being engaged by the rest of the mold (not shown). In this position, the matching flat inner faces 32, 34 abut and the curved inner surfaces 36 of the pair of thread split inserts 12, 14 combine to form an opening 46 extending therethrough to mold the outer surface 20 of the neck portion 18 of the preform 10. Of course, during molding an elongated cylindrical core (not shown) extends through this opening 46 to form the inner surface 48 of the preform 10.

The thread split inserts 12, 14 are each made of steel with an enclosed conduit 50 for circulating a cooling fluid such as water. While each thread split insert 12, 14 has a separate cooling fluid conduit 50, the combination of the two conduits 50 in a pair of thread split inserts 12, 14 provides a nearly uniform distribution of cooling around the opening 46 in which the cavity is partially formed.

Figure 5:
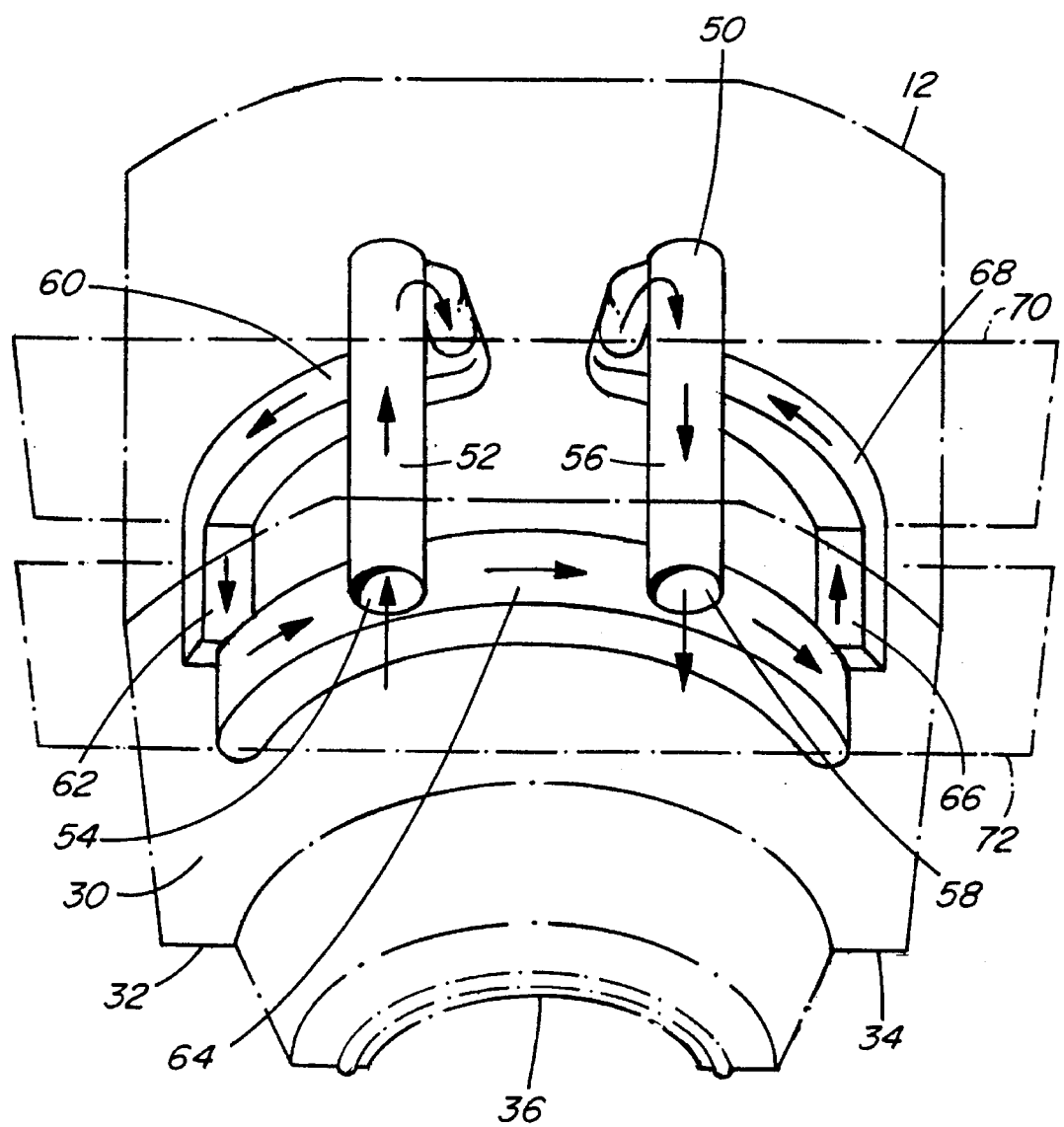
FIG. 5 is a schematic view showing the configuration of the cooling fluid conduit in each of the thread split inserts.

Reference is now made to FIG. 5 in describing the configuration of the enclosed cooling fluid conduit 50 in each mold split according to the invention. The cooling fluid circulates through the cooling fluid conduit 50 in the direction indicated by the arrows. In this embodiment, the cooling fluid conduit 50 has an inlet portion 52 extending from an inlet 54 at the rear end 30 and an outlet portion 56 extending to an outlet 58 at the rear end 30. The inlet and outlet portions 52, 56 extend relatively close together midway around the curved inner surface 36. As can be seen, a first curved portion 60 extends around the curved surface 36 from the inlet portion 52 to a first longitudinal portion 62 which extends rearwardly near the first flat inner face 32. A second longer curved portion 64 extends around the curved inner surface 36 from the first longitudinal portion 62 to a second longitudinal portion 66 which extends forwardly near the second flat inner face 34. A third curved portion 68 then extends around the curved surface 36 to connect the second longitudinal portion 66 to the outlet portion 56. The cooling fluid conduit 50 is enclosed in the steel insert and the curved and longitudinal portions extend close to the curved inner surface 36 to provide maximum cooling around the opening 46 in which the cavity is partially formed. Of course, the curved portions 60, 64, 68 have the same center point as the curved inner surface 36 so they are equally spaced therefrom. As clearly seen in FIG. 5, the first and third curved portions 60, 68 of the cooling fluid conduit 50 extend in a first common plane 70 and the second curved portion 64 of the cooling fluid conduit 50 extends in a second plane 72 extending substantially parallel to the first plane 70 of the first and third curved portions 60, 68.

In use in a multicavity mold, a number of pairs of thread split inserts 12, 14 according to the invention are mounted in a conventional mold. A supply of cooling water or other suitable cooling fluid is connected to the inlet 54 of each thread split insert to circulate through the cooling fluid conduit 50. Pressurized melt from a molding machine is then injected into the cavity partially formed by the opening 46 through each pair of thread split inserts 12, 14 according to a predetermined injection, cycle. After the cavities are full, injection pressure is held momentarily to pack and then released. After a short cooling period, the mold is opened to eject each preform 10. This is done by the preform. 10 first being ejected from the core and the two thread split inserts 12, 14 are separated to drop the preform 10 onto a conveyor belt or cooling plate. Of course, this requires that the two thread split inserts 12, 14 be separated to release the ring collar 22 and threads 24 of the preform 10. After ejection, the mold is closed and injection pressure is reapplied to refill the cavity. Circulation of the cooling fluid in the separate cooling fluid conduits 50 which extend in the thread split inserts 12, 14 in two different planes 70, 72 around the opening 46 cools the neck portion 18 of the preform 10 more quickly and thus allows the injection cycle frequency to be increased.

While the description of the thread split inserts 12, 14 have been given with respect to a preferred embodiment, it will be evident that various other modifications are possible without departing from the scope of the invention as understood by those skilled in the art and as defined in the following claims. In particular, the configuration of the cooling fluid conduit 50 can be changed so that the two separate planes 70, 72 in which the curved portions 60, 64, 68 extend can be reversed.

The embodiments of the invention in which an exclusive property or privilege is claimed is defined as follows:

1. In a pair of thread split inserts used in injection molding elongated hollow bottle preforms, each preform having a neck portion with an outer surface forming a ring collar and threads extending between an open end and the ring collar, each thread split insert having a rear end and first and second flat inner aligned faces extending on opposite sides of a curved inner surface, the thread split inserts to be mounted together in a mold with the respective flat inner faces of the thread split inserts abutting wherein the curved inner surfaces of the thread split inserts combine to form an opening therethrough shaped to mold the outer surface of the neck portion of the preform, each thread split insert having a semicircular groove to form the ring collar and a thread portion extending between the semicircular groove and the rear end to form the threads, the improvement wherein;

each thread split insert has an enclosed conduit with a configuration for circulating cooling fluid through the thread split insert, the cooling fluid conduit having an inlet portion and an outlet portion extending close together midway around the curved inner surface, a first curved portion extending around the curved inner surface from the inlet portion to a first longitudinal portion near the first flat inner aligned face, a second curved portion extending around the curved inner surface from the first longitudinal portion to a second longitudinal portion near the second flat inner aligned face, and a third curved portion extending around the curved inner surface from the second longitudinal portion to the outlet portion.

2. A pair of injection molding thread split inserts as claimed in claim 1 wherein the first and third curved portions of the cooling fluid conduit extend in a first common plane.

3. A pair of injection molding thread split inserts as claimed in claim 2 wherein the second curved portion of the cooling fluid conduit extends in a second plane extending substantially parallel to said first common plane.

4. A pair of injection molding thread split inserts as claimed in claim 3 wherein the inlet and outlet portions of the cooling fluid conduit extend from the rear end of the thread split insert.

5. A pair of injection molding thread split inserts as claimed in claim 4 wherein each thread split insert is formed of steel.

\* \* \* \* \*